(12) United States Patent
Baek et al.

(10) Patent No.: US 9,195,849 B2
(45) Date of Patent: Nov. 24, 2015

(54) CLOUD APPLICATION INSTALLED IN CLIENT TERMINAL CONNECTED TO CLOUD SERVER

(71) Applicants: Kings Information & Network Co., Ltd., Hanam-si, Gyeonggi-do (KR); INTELLECTUAL DISCOVERY CO., LTD., Seoul (KR)

(72) Inventors: Jong Kyung Baek, Hanam-si (KR); Young Ho Jung, Hanam-si (KR); Ye Seong Park, Hanam-si (KR); In Seon Hwang, Hanam-si (KR); Cheol Ung Jeong, Hanam-si (KR); Min Jong Kim, Hanam-si (KR)

(73) Assignees: KINGS INFORMATION & NETWORK CO., LTD., Hanam-si (KR); INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 14/179,124

(22) Filed: Feb. 12, 2014

(65) Prior Publication Data
US 2014/0258717 A1 Sep. 11, 2014

(30) Foreign Application Priority Data

Mar. 6, 2013 (KR) .................. 10-2013-0023961
Apr. 30, 2013 (KR) .................. 10-2013-0048330

(51) Int. Cl.
*H04L 29/06* (2006.01)
*G06F 21/62* (2013.01)
*H04L 29/08* (2006.01)

(52) U.S. Cl.
CPC ........ *G06F 21/6218* (2013.01); *H04L 63/0428* (2013.01); *H04L 67/1097* (2013.01)

(58) Field of Classification Search
CPC .................................................. G06F 21/6218
See application file for complete search history.

(56) References Cited

U.S. PATENT DOCUMENTS

2013/0136258 A1* 5/2013 Grube et al. ............... 380/44
2013/0305039 A1* 11/2013 Gauda .......................... 713/153
2014/0059344 A1* 2/2014 Branton et al. ............. 713/165
2014/0115329 A1* 4/2014 Sturonas et al. ............ 713/165

OTHER PUBLICATIONS

Jong Kyung Baek et el., "A Study on Contents Security Using Virtual Space in Mobile Platform Environment", ICCT, Jul. 3, 2013, 2 pages.
Jong Kyung Baek et el., "A Study of Contents Security Using a Secure Container in Mobile Platform Environment", International Journal of Advanced Computer Technology (IJACT), vol. 5, No. 12, Sep. 3, 2013, 7 pages.

* cited by examiner

*Primary Examiner* — Mohammad L Rahman
(74) *Attorney, Agent, or Firm* — Rothwell, Figg, Ernst & Manbeck, P.C.

(57) ABSTRACT

A cloud application system installed in a client terminal that is connected to a cloud server via a network, the cloud application system comprising: a first driver controlling module configured to display a list of folders of a relevant user in the cloud server by communicating with the cloud server; a second cloud driver controlling module configured to encrypt a file of the cloud server to store it as the encrypted security file when the file is stored in the client terminal.

7 Claims, 20 Drawing Sheets

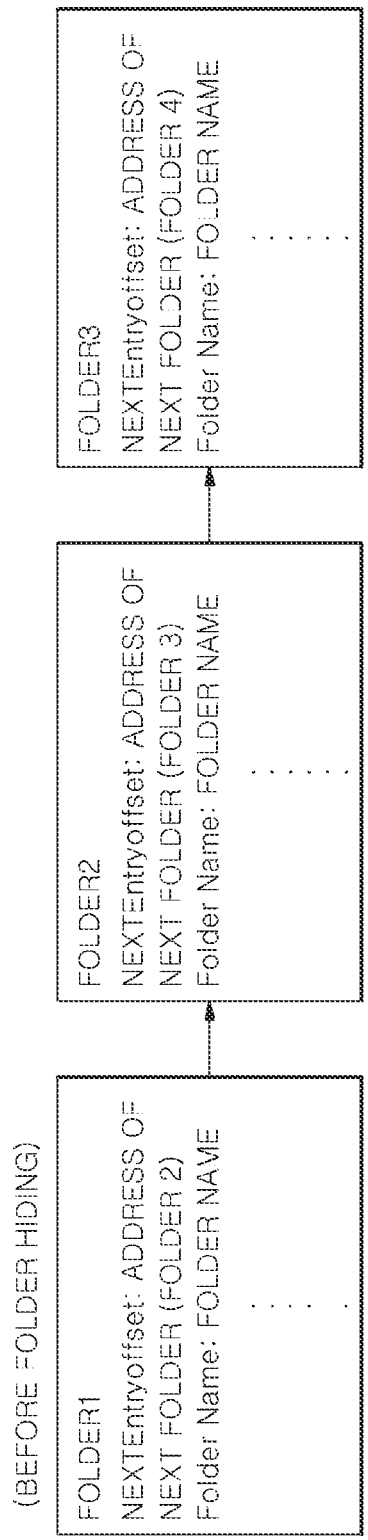

FIG. 16B (AFTER FOLDER HIDING)

FOLDER1
NEXTEntryoffset: ADDRESS OF
NEXT FOLDER (FOLDER 3)
Folder Name: FOLDER NAME
. . . . .

FOLDER WITH SECURITY NEEDED

FOLDER2
NEXTEntryoffset: ADDRESS OF
NEXT FOLDER (FOLDER 3)
Folder Name: FOLDER NAME
. . . . .

FOLDER3
NEXTEntryoffset: ADDRESS OF
NEXT FOLDER (FOLDER 4)
Folder Name: FOLDER NAME
. . . . .

CLOUD APPLICATION INSTALLED IN CLIENT TERMINAL CONNECTED TO CLOUD SERVER

RELATED APPLICATIONS

This application claims the benefit of Korean Patent Application No. 10-2013-0023961, filed on Mar. 6, 2013, and Korean Patent Application No. 10-2013-0048330, filed on Apr. 30, 2013, which are hereby incorporated by reference as if fully set forth herein.

FIELD OF THE INVENTION

The present invention relates to a management system for a file control, security and others that is performed in client terminals such as desktop personal computers (PCs), mobile phones, notebook PCs, PDAs (Personal Data Assistant) connected to a cloud server in a cloud computer environment.

BACKGROUND OF THE INVENTION

In recent, with the development of information-oriented society, cloud services using a high-speed data transfer and large capacity storage have been actively ongoing. The cloud service refers to an environment that enables the distributed processing of a large capacity database in the virtual space of the Internet with the help of a web-based application and various terminals such as desktop PCs, mobile phones, notebook PCs, PDAs, etc. to fetch or process the data.

Thus, in the cloud computing environment, a service provider integrates servers (in data centers) that are distributed to multiple locations with virtualization technology to provide services that users need.

In this case, the user selects guest machines to be used on a virtual space created through the virtualization technique (a guest machine means a conceptual logical equipment on the virtual space and may be understood as a kind of virtual machines including an operating system, security and the like) as much as needed at any point in time, instead of directly installing the necessary resources such as an OS (Operation System), storage, application, security, etc. in his/her own terminal. Therefore, the user does not pay purchasing cost for the respective computing resources, but pays the cost for the computing resources based on the amount of the use, which leads to economic benefits.

In addition, the user has benefits that can perform a task that requires a large-capacity storage device and a high-performance computing resource by connecting to the cloud network through a terminal having a capability of network connection and performing arithmetic functions and receives advanced services in any place.

However, in the cloud computing environment, because of issues of security threats such as external hacking attacks, security issue that can protect the assets from the threats has emerged as the most important challenge. Existing cloud security system merely relies on security equipment provided from the service provider and collect and manage security events that occur segmentally fragmentarily.

SUMMARY OF THE INVENTION

In view of the above, the present invention provides a management system and method for a file control, security and others that are performed in a client terminal such as a desktop personal computer (PC), mobile phone, notebook PC, PDA connected to a cloud server in a cloud computer environment.

In accordance with a first aspect of the embodiment, there is provided a cloud application system installed in a client terminal that is connected to a cloud server via a network, the cloud application system including: a first driver controlling module configured to display a list of folders of a relevant user in the cloud server by communicating with the cloud server; and a second cloud driver controlling module configured to encrypt a file of the cloud server to store it as an encrypted security file when the file is stored in the client terminal.

The client terminal may include any equipment having a networking capability such as a PC, notebook, mobile terminal, etc. Preferably, the client terminal may be a mobile terminal and may be a smart phone among others. The smart phone refers to a system in which the operating system such as Android OS, iOS, or the like is installed in a mobile cellular phone. The application of the embodiment to the mobile terminal enables to implement that the user downloads necessary files only without downloading of information in a user folder in the cloud server in a lump. The downloaded files are then encrypted and kept in the mobile terminal, thereby maintaining a security of the files.

Preferably, an area that is displayed on the client terminal is classified into a first driver part and a second driver part so that they can be selected, the first driver part being configured to be run by the first driver controlling module and the second driver part being configured to be run by the second driver controlling module. According to one implement, a first driver part displays a list of the user folders in the cloud server and a second driver part encrypts files only that are selected by the user only before being stored in the client terminal. With this configuration, the user may store the files in the cloud server in the client terminal as needed. Therefore, it is possible to store the relevant files while maintaining the security of the relevant files. The mobile terminal in which the Android OS, iOS OS, etc. is installed may secure the security in this manner because it does not have the function of the Windows virtual disk driver.

Meanwhile, although the structure of a security file may be possible to have different types that are not specifically limited, preferably the security file may include a header portion having an entry of files and folder structures stored therein and a body portion having file binary values stored therein, wherein the header and body portions may be encrypted. Further, when the structure of the security file is configured such that it can be commonly used in an application for the mobile terminal and an application for the PC, it is possible to commonly utilize the embodiment even in different heterogeneous user terminals.

When a document file that is selected in the encrypted security file is carried out, the second controlling module encrypts the file to make it into a temporal file and stores the temporal file in a system area, thereby implementing that the temporal file can be used by other application while protecting the document file against hacking.

In accordance with a second aspect of the embodiment, there is provided a method for controlling a file in a cloud application installed in a client terminal that is connected to a cloud server via a network, the method including: displaying a list of relevant user folder in the cloud server by communicating with the cloud server; and storing a particular file as an encrypted security file when the particular file in the displayed list is stored in the client terminal.

According to the embodiment, it is possible to provide to maintain the security of the files in the client terminal, by encrypting the particular file before being stored when the particular file is stored in the client terminal. Further, when the encrypted security file is executed, the file is decrypted and is stored as a temporal file. In case where the mobile terminal has the Android or iOS that is the OS installed in the mobile terminal, the temporal file is stored in the system area, thereby maintaining the security of the file even if the file is executed. The reason of performing a series of these processes is for maintaining the security of the files when the particular file is stored and executed in the client terminal.

Further, when the encrypted security file is carried out, an application suitable for the file property of the temporal file is run in cooperation with the cloud application.

Meanwhile, the cloud application monitors in real time whether the application stores the file or finished working on the file during the application is run. When a relevant event is generated, the cloud application takes a proper action in accordance with the event.

Meanwhile, when the relevant file which runs the temporal file is open, finally corrected date of a relevant document of the file is stored in a memory. In case where the application stores data of the relevant file, the corrected date and corrections are reflected to the temporal file stored in the system area when there are the corrections. When the application has finished working on the relevant file, the cloud application compares the corrected data of the opened file and the corrected data that the application has been corrected, and when the corrected dates are same with each other, the temporal file is deleted.

However, when the corrected dates are not same with each other, the cloud application fetches a file name and binary data of the relevant file and overwrites the relevant file. After that, the cloud application deletes the temporal file and performs synchronization of the file to the cloud server to reflect the corrections made by the user.

In accordance with a third aspect of the embodiment, there is provided a structure of a security file for use in a cloud application installed in a client terminal that is connected to a cloud server via a network, the structure including: the structure of a security file for common use in an application for a mobile terminal and an application for a PC, which includes a header portion having an entry of files and folder structures stored therein and a body portion having file binary values stored therein, wherein the header and body portions may be encrypted, wherein the header and body portions may be encrypted.

When the structure of the security file is configured such that it can be commonly used in an application for the mobile terminal and an application for the PC, it is possible to commonly utilize even in different heterogeneous user terminals that install different OS such as android, iOS. Further, it is possible to enhance the security in comparison to a simple encryption method by classifying the structure of the security file into the header portion having an entry of files and folder structures stored therein and a body portion having file binary values stored therein.

Further, it is possible to provide a variety of options to a mobile OS and PC OS at the time of the system design by introducing the structure of the security file that is capable of commonly utilizing in an application for the mobile terminal and an application for the PC. That is, because the files of the cloud server have the same type when they are made into the security file, it is possible to easily utilize the security files having the same type even in different heterogeneous user terminals.

Meanwhile, when a relevant file is stored in the client terminal from the cloud server, the file is stored as an encrypted security file. When the encrypted security file is executed, it is decrypted and is stored as a temporal file for the execution thereof. Further, when the encrypted security file is executed, an application suitable for the file property of the temporal file is run.

In accordance with a fourth aspect of the embodiment, there is provided a method for controlling a file in a cloud application installed in a client terminal that is connected to a cloud server via a network, the method including: decrypting, in the cloud application, a file in a relevant folder in the cloud server and storing it as an encrypted security file in the client terminal, and in case where the encrypted security file is executed, loading, in the cloud application, the relevant file into a memory and decrypting it in real time. When the decrypted file is stored, the cloud application encrypts the file.

The method may further comprise running the decrypted file in cooperation with an application suitable for the format of the decrypted file after decrypting the file in real time.

Preferably, the method further comprises monitoring, in the cloud application, whether the relevant file is stored or not in real time. When an event to store the file is generated, synchronization of the file with the cloud server is performed.

The security file includes a header portion having an entry of files and folder structures stored therein and a body portion having file binary values stored therein.

In accordance with a fifth aspect of the embodiment, there is provided a method for controlling a file in a cloud application installed in a client terminal that is connected to a cloud server via a network, the method including: in case where the cloud application stores a file in a relevant user folder in the cloud server in the client terminal, creating two security files and two security folders (F, G) corresponding to the security files, wherein the first security file contains only link information to the second security folder that is encrypted correspondingly to the first security folder, the second security file corresponds to the second security folder, and at least a portion of the relevant user folder of the cloud server is encrypted and stored in a security state.

The two security files and their corresponding two security folder (F, g) are implemented using the function of a Windows virtual disk driver.

Meanwhile, in case where there is a request for accessing the second security folder, the cloud application performs a hiding function in order for the second security folder to be invisible, thereby preventing a hacking program from fundamentally accessing the second security folder. Because the second security folder stores a substantial data, the security is urgently needed and thus the security is conducted in multiple manners.

It is preferable that the security file includes a header portion having an entry of files and folder structures stored therein and a body portion having file binary values stored therein.

When a first encrypted security file is executed, the cloud application fetches a relevant file from the second security file to load it into a memory and decrypts it in real time, thereby improving the security of the file.

Further, the cloud application monitors an event such as creation, name change, deletion, storage, and correction of the file, and when a relevant event is generated, it performs synchronization of the file with the cloud server in compliance with the event.

According to the present invention, it is possible for the user to readily utilize the relevant file stored in the client terminal from the cloud server while effectively keeping the security of the file.

According to the present invention, it is possible to kept the security without using the function such as the Windows virtual disk driver in the mobile terminal in which the OS such as the Android, iOS, etc. is installed Further, according to the present invention, it is possible to provide a variety of options to the mobile OS, PC OS at the time of designing the system by introducing the structure of the security file that is commonly applied to an application for the mobile terminal and an application for the PC.

BRIEF DESCRIPTION OF THE DRAWINGS

The above and other objects and features of the present invention will become apparent from the following description of the embodiments given in conjunction with the accompanying drawings, in which:

FIGS. 16A and 16B show folder structures to perform a file hiding in accordance with an embodiment of the present invention;

DETAILED DESCRIPTION OF THE EMBODIMENTS

Hereinafter, the embodiments of the present invention will be described in detail with reference to the accompanying drawings. However, the embodiments of the present invention as illustrated below may be modified in various different forms, and the scope of the present invention is not intended to limit the embodiments as set forth above. It should be noted that the embodiments are provided to make a full disclosure and also to allow those skilled in the art to know the full scope of the present invention.

Figure 1:
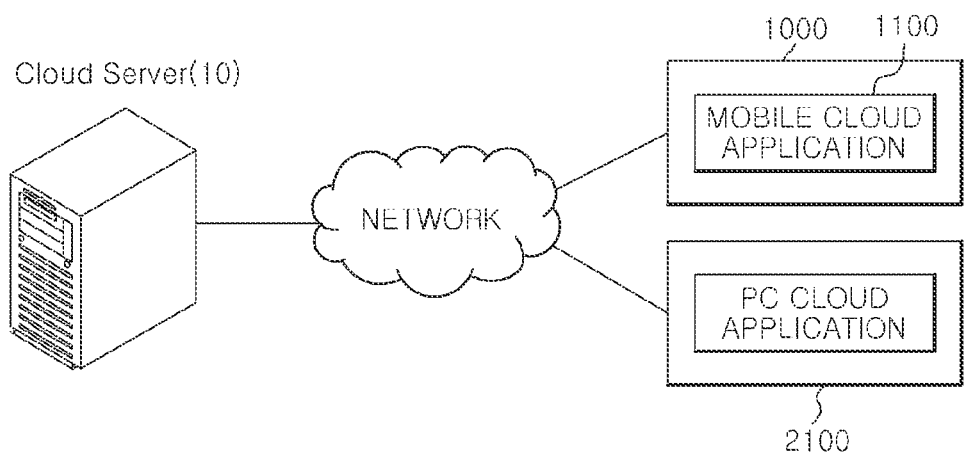
FIG. 1 is a schematic configuration diagram of an overall cloud computing system to which the embodiment of the present invention.

FIG. 1 is a schematic configuration diagram of an overall cloud computing system to which the embodiment of the present invention.

Referring to FIG. 1, a cloud computing system includes a plurality of client terminals 1000, 2000 and a cloud server 10 that are connected via a network.

The client terminals 1000 and 2000 are entities utilizing resources of the cloud server 10 on the network in a cloud computing environment. Specifically, a client terminal refers to equipment having a networking capability, which is a terminal that is used by the user, e.g., a PC, a notebook, a mobile terminal, and others. FIG. 1 shows that the client terminal represented by a reference numeral 1000 is a mobile terminal and includes a mobile cloud application 1100, whereas the client terminal represented by a reference numeral 2000 is a personal computer (PC) and includes a PC cloud application 2100. However, it will be understood that the mobile cloud application 1100 and the PC cloud application 2100 are classified for a convenience and detailed functions of the respective applications may be exchanged with each other.

The cloud server 10 is a physical equipment that has a connection with the plurality of the client terminals 1000, 2000 and provides system resources (which includes, e.g., OS, CPU, memories, storage devices). In a cloud computing environment, it is noted that a plurality of servers is connected with the plurality of the client terminals 1000 and 2000, and one of them, e.g., the cloud server 10 represents a concept to embrace the plurality of servers. For example, a guest machine that is created in a virtual space allocates the system resources to the client terminals 1000 and 2000 so that they utilize the system sources allocated to them. The foregoing matters may be understood as known general concepts in the art.

Figure 2:
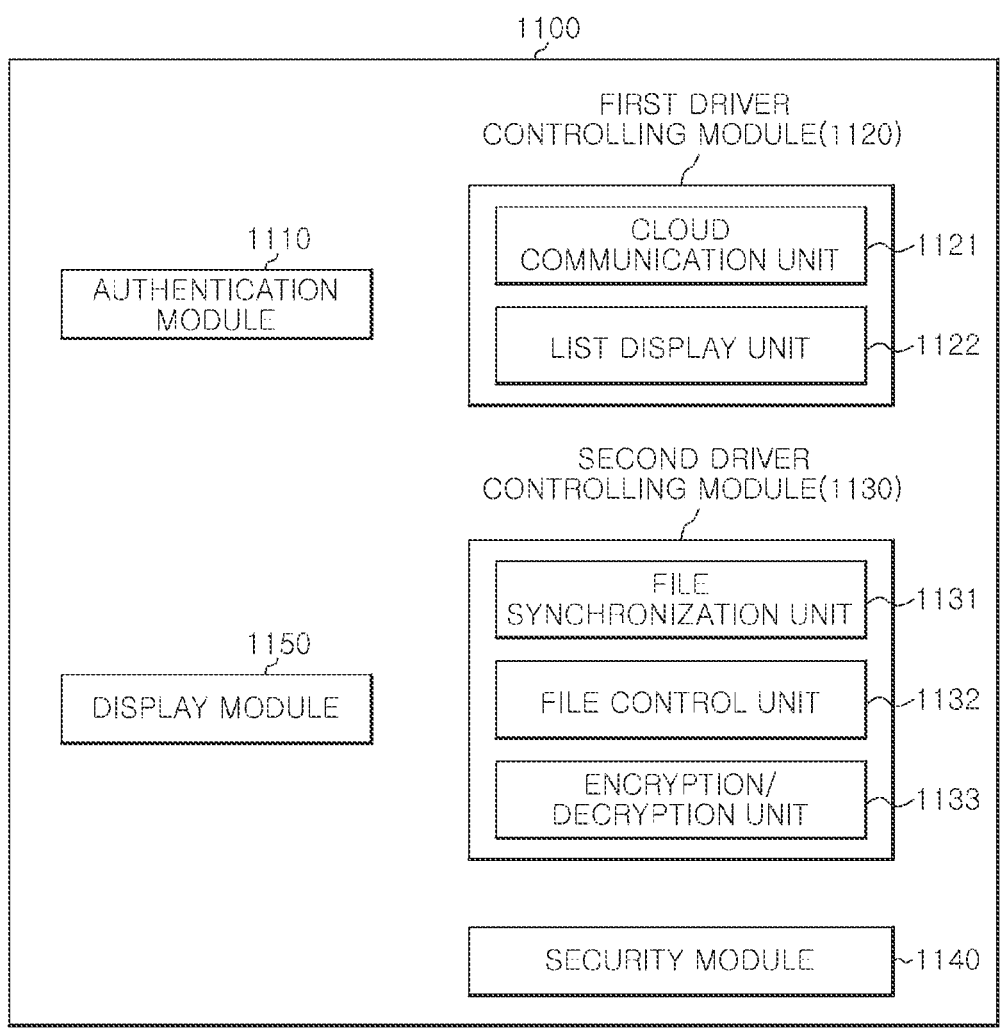
FIG. 2 is a schematic configuration diagram of a mobile cloud application that is installed in a mobile terminal in a cloud computing system in accordance with an embodiment of the present invention.

FIG. 2 is a block diagram of the mobile cloud application 1100 that is installed in a mobile terminal in a cloud computing system in accordance with an embodiment of the present invention.

Referring to FIG. 2, the mobile cloud application 1100 includes an authentication module 1110, a first driver controlling module 1120, a second driver controlling module 1130, a security module 1140, and a display module 1150.

Figure 3:
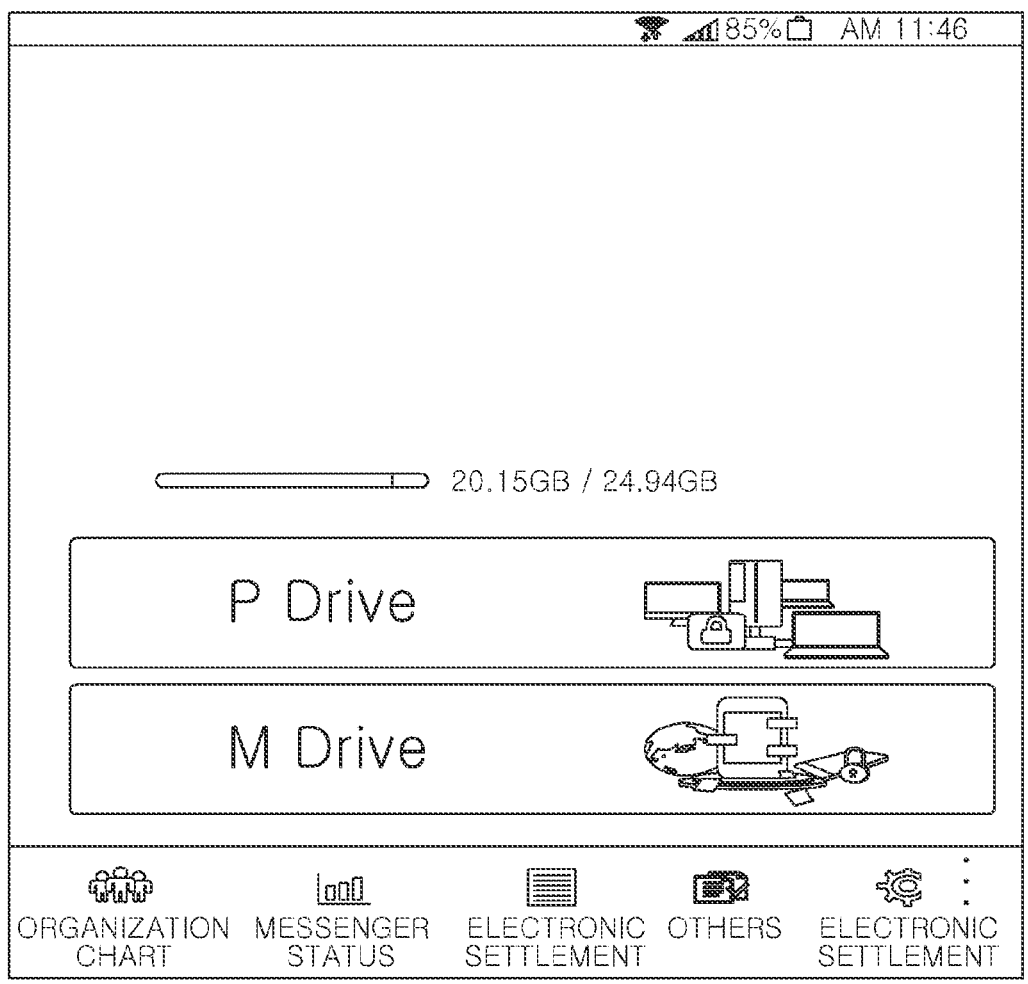
FIG. 3 illustrates a screen carried out by a mobile cloud application shown in FIG. 2 installed in a mobile terminal.

When the mobile cloud application 1100 is carried out, a first driver part (a P drive in FIG. 3) and a second driver part (an M drive in FIG. 3) are provided, the first driver unit and the second driver unit being controlled by the first driver controlling module 1120 and the second driver controlling module 1130, respectively. FIG. 3 shows a screen carried out by the mobile cloud application 1100 of FIG. 2 installed in the client terminal.

The first driver controlling module 1120 includes a cloud communication unit 1121 that communicates with the cloud server 10 and a list display unit 1122 that displays a list of user folders.

The second driver controlling module 1130 includes a file synchronization unit 1131, a file control unit 1132, and encryption/decryption unit 1133. The file synchronization unit 1131 serves to perform an update of files stored in the client terminal 1000 into the user folder of the cloud server 10. The file control unit 1132 is responsible for the creation of folders and files. The encryption/decryption unit 1133 serves to protect a document file or the like in the cloud server 10 by making it to have a security file structure when the user wishes to store it in the client terminal 1000.

When a file in the cloud server 10 is stored in the client terminal, the second driver controlling module 1130 obtains a file name and binary data of the relevant file to create a security file.

The security module 1140 monitors in real time whether, for example, a word processing application (that is run in cooperation with the mobile cloud applications) stores the file or finished working on the file during the running of the word processing application.

The authentication module 1110 authenticates the user by communicating with the cloud server 10 when the user logs in.

The display module 1150 serves to provide a UI (User Interface) to the client terminal. For example, when the user clicks an execution icon to run the cloud application, a screen for login is displayed with the help of the display module.

The following is a detailed description on the installation of the mobile cloud application 1100 and a file read, a file edition, and the others by the mobile cloud application 1100.

Figure 4:
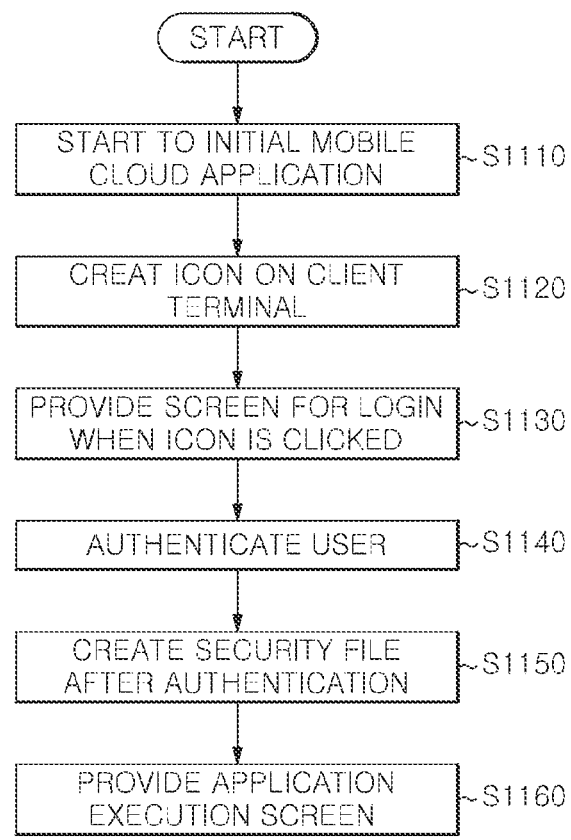
FIG. 4 is a flow diagram illustrating a process of installing the mobile cloud application shown in FIG. 2 in a mobile terminal.

FIG. 4 is a flow diagram illustrating a process of installing the mobile cloud application 1100 shown in FIG. 2 in the mobile terminal.

The user downloads the mobile cloud application for installing in the client terminal 1000 and initiates to install the mobile cloud application (S1110). When the installation of the mobile cloud application 1100 is completed, an icon is created on the client terminal 1000 (S1120). When the user clicks the icon to run the mobile cloud application, a screen for login is displayed (S1130). When the user logs in, the authentication module 1110 of the mobile cloud application 1100 authenticates the user by communicating with the cloud server 10 through the file synchronization unit 1131 of the second driver controlling module 1130 (S1140). After the completion of the user authentication, the mobile cloud application 1100 creates a security file (S1150). During this procedure, the cloud server 10 checks whether a folder in the cloud server 10 associated with an ID of the relevant user exists. If it is negative, then a new folder is created.

Next, the mobile cloud application 1100 is run to provide an execution screen (S1160). The execution screen presents a screen containing a first driver part (P drive) and a second driver part (M drive) to the user. FIG. 3 shows a screen carried out by the mobile cloud application 1100 installed in the client terminal.

Figure 5:
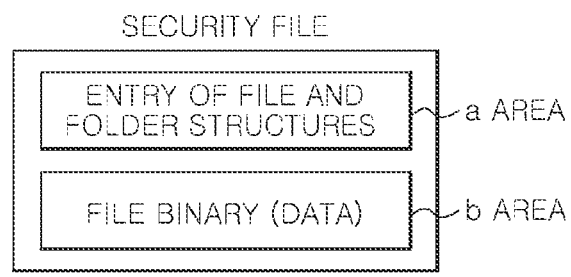
FIG. 5 depicts a view illustrating the structure of a security file in accordance with an embodiment of the present invention.

On the other hand, FIG. 5 depicts a view illustrating the structure of a security file in accordance with an embodiment of the present invention. Referring to FIG. 5, the security file includes a header portion and a body portion. The header portion (an area 'a') has an entry of file and folder structures and the body portion (an area 'b') has a file binary value (DATA). In this case, the header and body areas of the security file are encrypted before being stored. Detailed information within the header portion may include a file name, a logical structural path, location of binary, binary size before being encrypted, hash value after being encrypted, and the like. In addition, the encryption may use, but not limited to, Advanced Encryption Standard (AES) algorithm which is U.S. federal standard algorithm, and other different kinds of encryption algorithms which are not particularly specified may also be employed.

The creation of the security file in the foregoing structure is for protecting data such as documents wen it is downloaded and stored in the cloud server 10. Meanwhile, the security file corresponds to the second driver part (M drive) via the virtual disk driver. More specifically, the second driver part is displayed by reading out a file header area from the security file that has been decrypted. Thereafter, when the user requests to open the file, the header area of the relevant file is read out again to get a location of a file binary area and the file is then opened by accessing the location. According to this way, there is an advantage in that the second driver part and the security file can be implemented without using a windows virtual driver technique of the Microsoft. The windows virtual driver is a driver used to perform an encryption and conversion of the security file to make it visible to the window EXPLORER. In accordance with an embodiment, because the security files are read in a preset format in a mobile OSs such as the Android, IOS, and the like, the virtual disk driver of the Microsoft may not be used. This enables to apply the structure of the security file and security capability to OS systems that do not use the virtual disk driver of the Microsoft.

The first driver part (P Drive) and the second driver part (M Drive) are controlled by the first driver controlling module 1120 and the second driver controlling module 1130, respectively. The first driver controlling module 1120 mainly functions to communicate with the cloud server 10 and display the user folders of the cloud server 10, and the second driver controlling module 1130 is in charge of the control related to store document files of the cloud server 10 in the client terminal.

The method for the encryption and decryption performed in the embodiment of the present invention will be described in more detail as follows. A specific method for encryption is to encrypt a relevant file when it is added to a virtual area. In case where there are several files, a list is first specified."protectfilelist.add" is a command that is made by the embodiment, which specifies the list of files admitted to enter the virtual area. By the following codes, a list for three files such as test_.doc, test_.xls, test_.ppt is specified:

protectfilelist.add(test_.doc)
    protectfilelist.add(test_.xls)
    protectfilelist.add(test_.ppt)
    virtaulspace.addfile(protectfilelist)

After specifying the list as described above, a command "virtaulspace.addfile" is used, which is a command used to store the list added by "protectfilelist.add" after being separated into a header file and a binary file in a virtual area (a virtual area storage, file used in the virtual area). As set forth above, the header and binary files are all encrypted. In this case, the header portion contains a file name, a logical structural path, location of binary, binary size before being encrypted, hash value after being encrypted, and the like.

Meanwhile, a decryption method is exemplified in the following codes:

fileheader.getfileheader(logical file path);
    InputStream=fileheader.getinputstream( );
    InputStream.read(buffer, length);

First, using a commandfileheader.getfileheader(logical file path), header information is obtained by using the logical file path information as a key value.

A logical file path is specified in the bracket by "fileheader.getfileheader", and then a binary location is located by input stream which is a command used to locate the binary location. More specifically, a program is informed of a point which is a first address of an encrypted file and the program receives a buffer and length by a command InputStream.read to put as much as the length into the buffer when the program reads the file. Then, a description is performed with respect to the file using a fixed algorithm through a read function.

Figure 6:
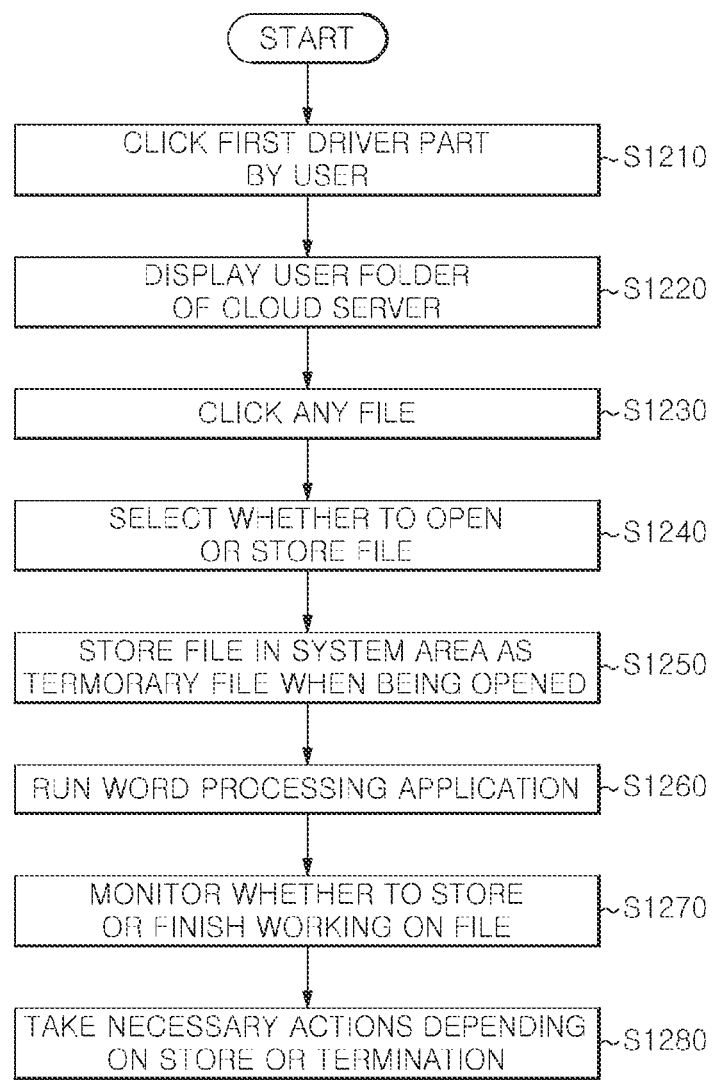
FIG. 6 is a flow diagram illustrating a process of performing a file read operation using the mobile cloud application shown in FIG. 2.

FIG. 6 is a flow diagram illustrating a process of performing a file read operation using the mobile cloud application 1100 shown in FIG. 2.

Referring to FIG. 6, when the use clicks the first driver part (P Drive) (S1210), the first driver controlling module 1120 displays a user folder in the cloud server 10 by communicating with the cloud server 10 (S1220).

After confirming the relevant folder, the user may select any files in the relevant folder. It is assumed in this embodiment that a document file (111.doc) is selected by the user (S1130). In this case, the mobile cloud application 1100 may launch an event for selecting whether to open or store the relevant file (S1240).

First, in case where the user selects to open the relevant file, the mobile cloud application 1100 downloads the document file (111.doc) from the cloud server and then stores as a temporary file in a system area (S1250). Meanwhile, a case of selecting to download will be discussed in FIG. 7 later. For instance, the temporary file may be stored in an area "data/data/xxx.xxxx (Application File name)/" in case for Android and an area "xxx.xxxxprivate/var/mobile/Applications/ (Application File name)/Document" in case for I-phone. The reason to store the temporary file in the system area is intended to protect from hacking the temporary file that is not encrypted up to now.

Thereafter, the mobile cloud application 1100 runs in cooperation with an application suitable for the format of the file to be opened (S1260). That is, when performing an open operation of the document file (111.doc), the mobile cloud application 1100 runs in cooperation with a word processing application installed in the mobile terminal. The user can view the opened file using the word processing application.

In case where the type of the document file to be opened is a .doc file, it may be implemented using the following codes:
   if    (File_extend.equals("DOC")//File_extend.equals("DOCX")
   intent.setDataAndType(Uri.fromFile(file),   "application/msword");

The commands such as File_extend.equals, intent.setDataAndType, and the like corresponds to a Java command, and a viewer compatible to the MS-WORD may be presented on a screen if the file has an extension of .doc or .docx.

Meanwhile, during the word processing application runs, the security module 1140 of the mobile cloud application 1100 monitors in real time whether the word processing application stores the file or finished working on the file (S1270). As a result of the monitoring, when the word processing application stores the file or finished working on the file, a necessary action may be taken (S1280).

Explaining by way of example of the Android, the real-time monitoring may be achieved by "FileObserver" class of Android. For example, the following code is illustrated.
   fileobserver (NotifyEvent, monitoring path)

After stablishing setting as above, the Android operating system calls the OnEvent( ) function, which is so-called a CallBack.

OnEvent (NotifyEvent, changed file path)

The notice of the changed file path and event type is informed through the above function.

Meanwhile, in case where working on the document is finished, the temporary file stored in the system area is deleted. If the word processing application tries to store the temporary file in another place, the mobile cloud application 1100 blocks the store in another place or remembers the stored file in order to delete it when the word processing application will be finished. In case where an opened file has been changed, the mobile cloud application allows the opened file to be stored in the M drive and then requests the server for file synchronization. Alternatively, it may be possible to allow what the word processing application stores the temporary file in the M Drive.

Figure 7:
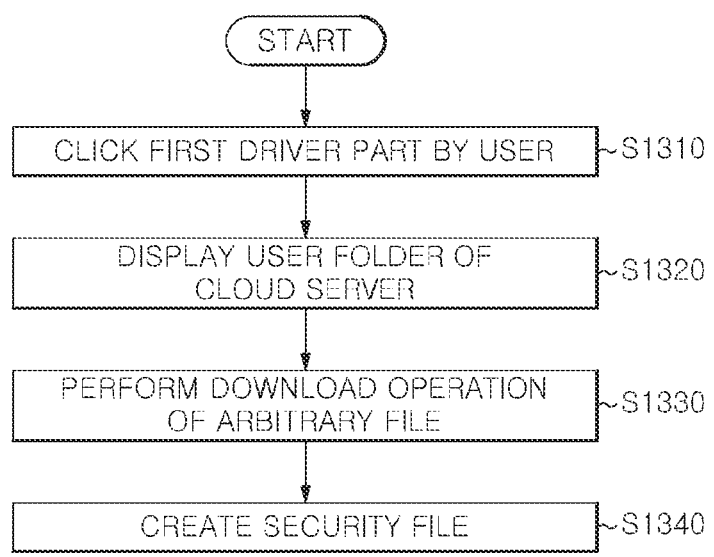
FIG. 7 is a flow diagram illustrating a process of performing a file downloading operation using the mobile cloud application shown in FIG. 2.

FIG. 7 is a flow diagram illustrating a process of performing a file download operation using the mobile cloud application 1100 shown in FIG. 2.

Referring to FIG. 7, when the user clicks the first driver part (P Drive) (S1310), the first driver controlling module 1120 displays user folders of the cloud server 10 by communicating with the cloud server 10 (S1320).

After confirming a relevant folder, the user selects any file (e.g., 111.doc) in the relevant folder and begins to download it into the mobile terminal of the user (S1330).

When the relevant file in the cloud server 10 is stored in the mobile terminal, the mobile cloud application 1100 obtains a file name and binary data of the relevant file to make them into a security file (S1340). The security file has the structure shown in FIG. 5 and is relevant to the second driver part (M Drive). That is, the second driver part (M Drive) is used to manage the files stored in the client terminal 1000 while maintaining the security of the files. The security of the security files may be guaranteed because they are encrypted as described with reference to FIG. 5.

The second driver part (M Drive) displays the downloaded files from the cloud server 10.

Figure 8:
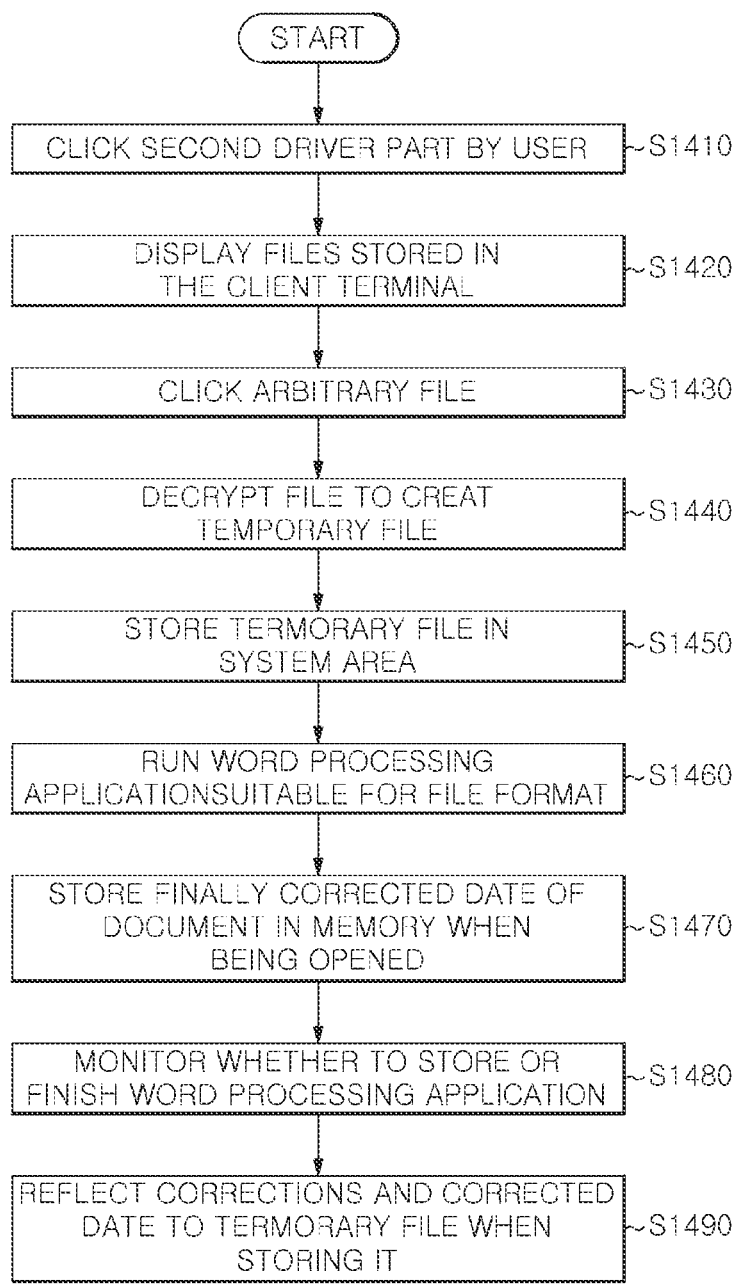
FIGS. 8 and 9 are a flow diagram illustrating a process of running a relevant file of a second driver part (M drive) using the mobile cloud application shown in FIG. 2.
Figure 9:
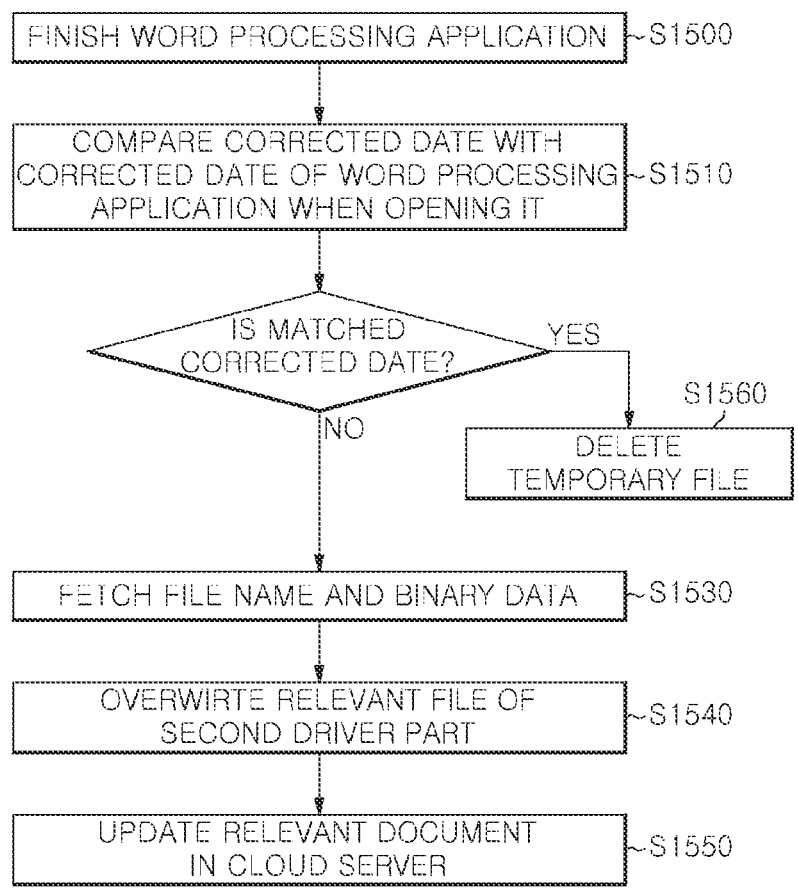

FIGS. 8 and 9 are a flow diagram illustrating a process of running a relevant file of a second driver (M drive) using the mobile cloud application 1100 shown in FIG. 2.

Referring to FIG. 8, when the user clicks the second driver part (M Drive) (S1410), the files stored in the folders in the client terminal by the user are displayed (S1420).

After confirming a relevant folder, the user may select any file. It is in this example assumed that an arbitrary document file (111.doc) is clicked (S1430). Herein, the document file (111.doc) is a security file that has been encrypted. Accordingly, once the user clicks the document file (111.doc), a file name and binary data are obtained and decrypted and a temporary file is then created (S1440).

The temporary file is stored in the system area (S1450). For instance, the temporary file may be stored in an area "data/data/xxx.xxxx(Application File name)/" for the Android and an area "xxx.xxxxprivate/var/mobile/Applications/ (Application File name)/Document" for the I-phone. To store the temporary file. The reason to store the temporary file in the system area is intended to protect from hacking the temporary file that is not encrypted up to now.

Thereafter, the mobile cloud application 1100 runs in cooperation with an application suitable for the format of the file to be opened (S1460). That is, when performing an open operation of the document file (111.doc), the mobile cloud application 1100 runs in cooperation with a word processing application installed in the client terminal. The user can view the opened file using the word processing application.

Further, in case where the word processing application opens the document file (111.doc), a finally corrected date of the relevant document file is stored in a memory (S1470).

Meanwhile, during the word processing application runs, the security module 1140 of the mobile cloud application 1100 monitors in real time whether the word processing application stores the file or finished working on the file (S1480).

When the word processing application stores data of the relevant document file (111.doc), it is checked that there are corrections, and if positive, the corrections and corrected date are reflected to the temporary file stored in the system are (S1490).

Continuing to FIG. 9, when the word processing application has finally finished working on the relevant document file (111.doc) (S1500), the mobile cloud application 1100 compares the corrected date for the opened file and the corrected date made by the word processing application (S1510). As a result of the comparison, when the corrected dates are same with each other, the temporary file is deleted (S1560).

However, when both the corrected dates are not same, the mobile cloud application 1100 obtains a file name and binary data of the relevant document file (111.doc) (S1530) and overwrites the relevant document (111.doc) of the second driver part (M Drive) (S1540). At this time, the temporary file is deleted. Thereafter, the file synchronization with the relevant file in the cloud server 10 is performed to update the relevant document file (111.doc) in the cloud server 10 so that the corrections by the user can be reflected (S1550).

Figure 10:
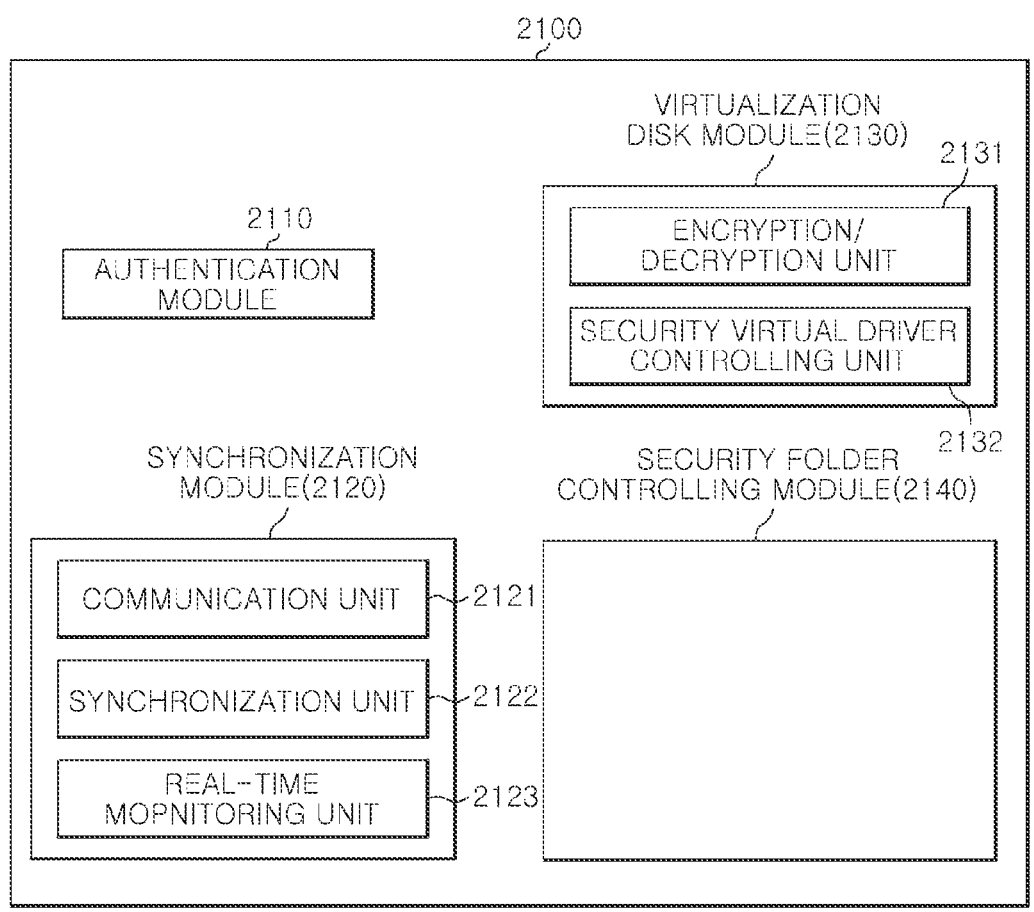
FIG. 10 is a schematic configuration diagram of a PC cloud application installed in a PC in a cloud computing system in accordance with an embodiment of the present invention.

FIG. 10 is a schematic diagram of the PC cloud application 2100 installed in a PC in a cloud computing system in accordance with an embodiment of the present invention.

Referring to FIG. 10, the PC cloud application 2100 includes an authentication module 2110, a synchronization module 2120, a virtualization disk module 2130, and a security folder controlling module 2140.

The synchronization module 2120 includes a communication unit 2121 to communicate with the cloud server 10, a synchronization unit 2122 to synchronize between files in the cloud server 10 and the client terminal 2000, and a real-time monitoring unit 2123 to monitor a file creation, name change, deletion, store, correction and the like in real time.

The virtualization disk module 2130 includes an encryption/decryption unit 2131 and a virtual driver controlling unit 2132. The encryption/decryption unit 2131 decrypts files in real time when they are fetched from a virtual disk driver (G folder) and then loaded into a memory and encrypts the files in real time when they are stored in virtual disk driver from the memory. The virtual driver controlling unit 2132 creates a security file using the function of the Windows virtual disk driver and matches it to the virtual disk driver (G folder). The security file includes a header portion and a body portion. The header portion (an area 'a') has an entry of file and folder structures and the body portion (an area 'b') has a file binary value. In this case, the header and body areas of the security file are encrypted before being stored.

The security folder controlling module 2140 serves to make a security folder (G) be hidden. A relevant user folder of the cloud server 10 is connected to the G folder (corresponding to a security file 2) via a link of the F folder (corresponding to a security file 1) installed in the client terminal 2000. This is achieved using a technique of the virtual disk driver of the Microsoft Windows. To be more specific, the virtual disk driver of the Microsoft Windows refers to a technique to match a file to a virtual disk drive not a physical disk drive to use the virtual disk drive as if it is a real disk driver. In this regard, the virtual disk drive performs tasks necessary to a virtual disk while monitoring the inputs and outputs to and from the virtual drive. When file input or output occurs in the virtual disk driver, the virtual disk driver causes the relevant input/output tasks to be made in the virtual drive. When the virtual disk driver reads a file, it reads out data from the image file and then provides it to the user. Therefore, the user may use the virtual drive as a general disk drive in such a manner.

Figure 11:
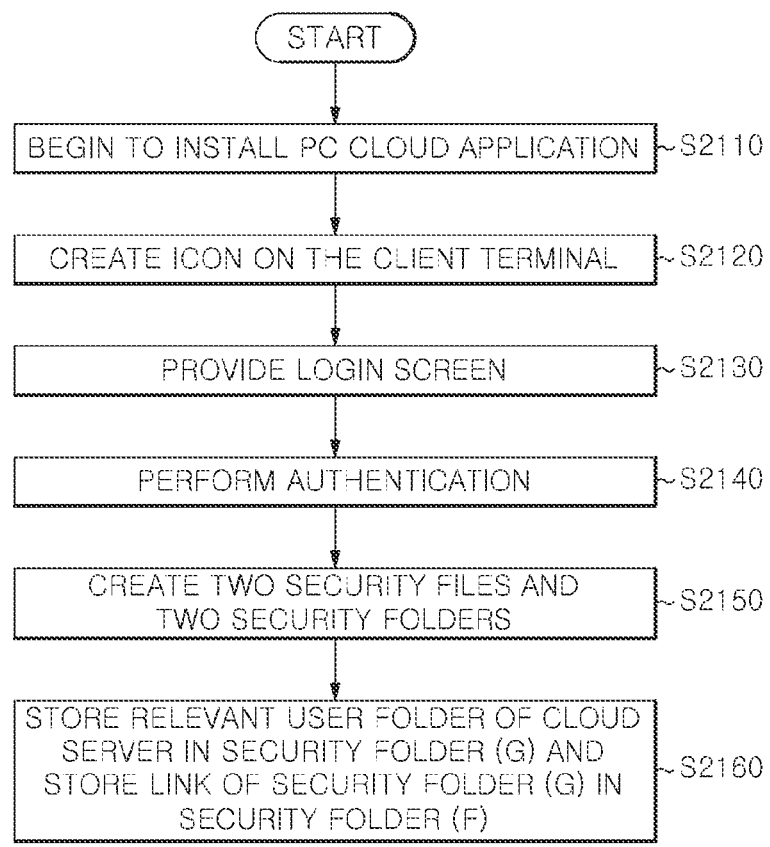
FIG. 11 is a flow diagram illustrating a process of installing the PC cloud application shown in FIG. 10.

FIG. 11 is a flow diagram illustrating a process of installing the Pc cloud application 2100 shown in FIG. 10.

The user downloads a PC cloud application for installation and installs the PC cloud application in the client terminal 2000 (S2110). An icon is created on the client terminal when the PC cloud application 2100 is completely installed (S2132). When the use clicks the icon to run the PC cloud application, a screen for login is displayed (S2130).

When the user logs in, the PC cloud application 2100 creates two the security files, a file 1 and a file 2, and two the security folders (F and G) using the Windows virtual disk driver function (S2150). During the above procedure, the cloud server 10 confirms whether there exists folders in the cloud server 10 corresponding to an ID of the relevant user and creates a folder newly when none folder exists. The two security files 1 and 2 correspond to the security folders F and G, respectively. The security file 1 contains only link information to the G folder that is encrypted correspondingly to the F folder. This reason is to hide the security folder (G) when there is a request to access it. If the G folder is hidden, the F folder is viewed but the G folder is invisible against a hacking. True data information is stored in the G folder.

Figure 12:
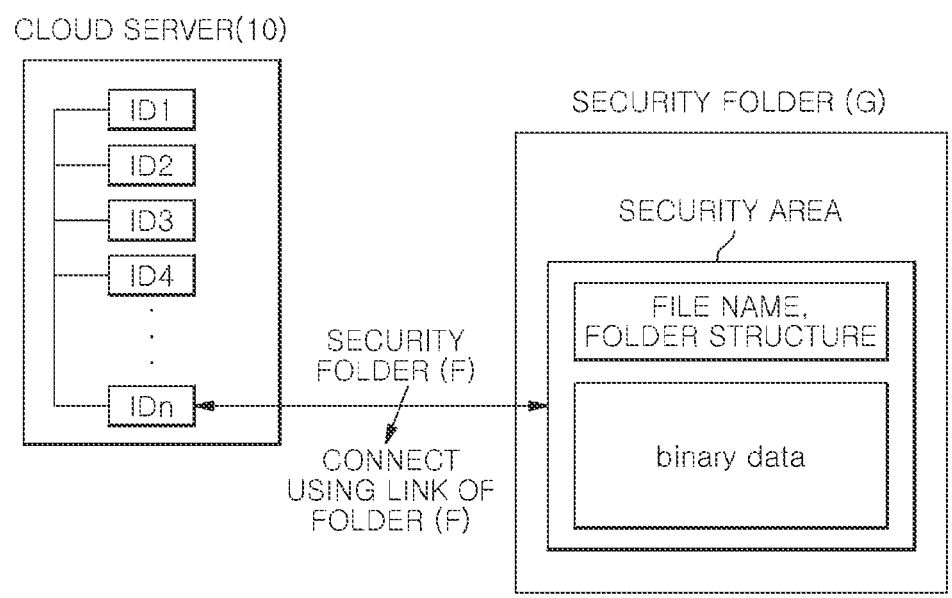
FIG. 12 is a conceptual diagram describing the connection between a security folder(s) in the PC cloud application shown in FIG. 10 and a relevant user folder of a cloud server.

FIG. 12 is a conceptual diagram describing the connection between security folders in the PC cloud application 2100 shown in FIG. 10 and relevant user folder(s) of the cloud server. Referring to FIG. 12, the relevant user folder(s) IDn (where n is an integer) is connected with the security folder G (corresponding to the security file 2) through a link of the security folder F (corresponding to the security file 2) installed in the client terminal.

Figure 13:
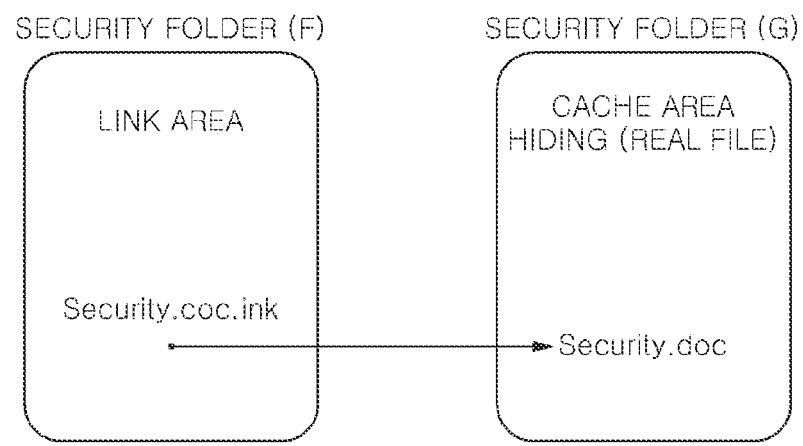
FIG. 13 shows a conceptual diagram describing the link between an F folder and a G folder in accordance with an embodiment of the present invention.

FIG. 13 shows a conceptual diagram describing the link between the F folder and G folder in accordance with an embodiment of the present invention. For example, the G folder is a region to perform a hiding function in a cache area to hide a true file, security.doc, which is stored therein. The F folder has only a link to the true file, security.doc, which is stored in the G folder, such as security.doc.link. A cache drive area is configured to delete the oldest file in order when files occupy a fixed capacity in order to secure the fixed capacity. With this configuration, although the file is really stored in the client terminal, direct access to the file is impossible but is allowed through only the link file. Although FIG. 13 shows a case where there is one file, it may be possible to have a link structure where several files are respectively linked.

The structure of the security file 2 includes a header portion and a body portion. The header area ('a' are) has an entry of file and folder structure and the body area ('b' are) has a file binary value. The header and body areas are encrypted before being stored. That is, the structure of the secondary security file is the same as that of the security file of the mobile cloud application 1100 shown in FIG. 5. This is one of the key effects of the present invention and is benefit in that the structure of the security file may be implemented in the same type regardless of the different mobile OSs such as Android OS, APPLE OS, etc. and PC OSs such as Windows OS, etc. This advantage enables to make applications simple by allowing the terminals to access the security file made in the consistent security file in the cloud environment. That is, the contents can be securely protected even if they are downloaded from heterogeneous cloud services.

After the operation in block S2150, the PC cloud application 2100 automatically downloads the relevant user folder of the cloud server 10 and stores it in the security folder (G) of the PC and the link of the security folder (G) is stored in the security folder (F) (S2160).

Meanwhile, while the PC cloud application 2100 is designed to automatically download the relevant user folder, other designs are also possible. In other words, the PC cloud application 2100 requests the cloud server for a particular file to be download and then downloads the files from the cloud server. In this case, the PC cloud application puts the true file that is downloaded into a hidden cache drive area (a virtual storage 2) and stores a link file to the true file in a drive (a virtual storage 1) accessible to the user. Accessing the true file is made through the link and the link connects the true file in the hidden virtual drive.

Figure 14:
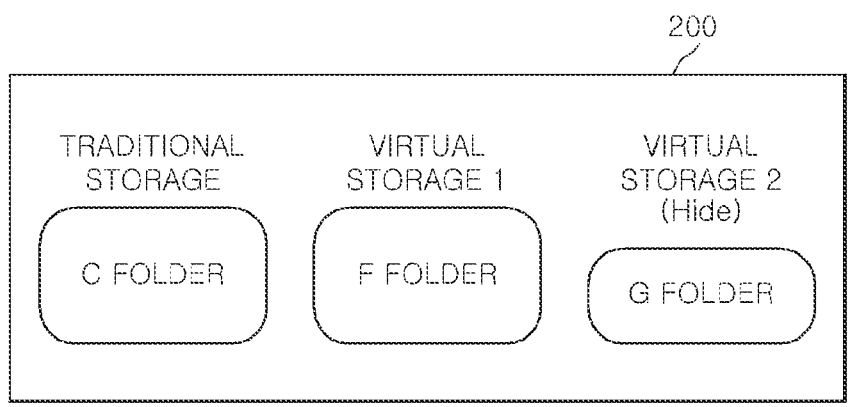
FIG. 14 is a conceptual diagram of a classified storage space embodied by the PC cloud application installed in a PC in a cloud computing system in accordance with an embodiment of the present invention.

FIG. 14 is a conceptual diagram of a classified storage space embodied by the PC cloud application 2100 installed in a PC in the cloud computing system in accordance with an embodiment of the present invention.

A traditional storage space is indicated as a C folder, a virtual storage is classified into a virtual storage 1 and a virtual storage 2. The virtual storage 1 represents the security folder (F) and the virtual storage 2 represents the security folder (G). The virtual storage is invisible to the user owing to the hiding function when the user accesses it.

Figure 15:
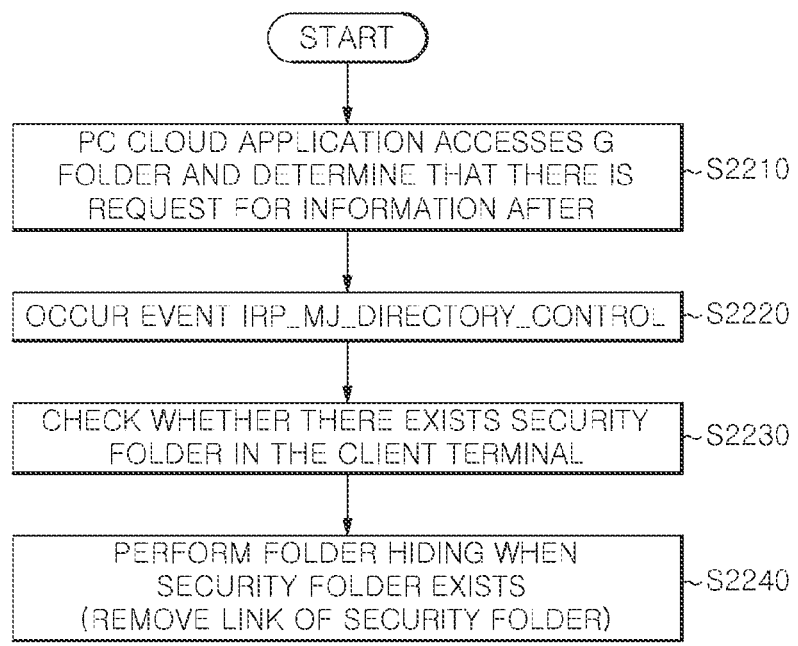
FIG. 15 is a flow diagram of a function of hiding a security folder (G) in a PC cloud application in accordance with an embodiment of the present invention.

FIG. 15 is a flow diagram of a function of hiding the security folder (G) in a PC cloud application 2100 in accordance with an embodiment of the present invention.

First, when the PC cloud application 2100 accesses the G folder and then requests for information (S2210), an event "IRP_MJ_DIRECTORY_CONTROL" the Windows is generated. This event is used to notify changed information such as when there is a request for the list included in the folder or when there is a change in files contained in the folder or the folder itself. A miner function of IRP_MJ_DIRECTORY_CONTROL may be composed of IRP_MN_QUERY_DIRECTORY and IRP_MN_NOTIFY_CHANGE_DIRECTORY.

The IRP_MN_QUERY_DIRECTORY calls a file object of the folder from which information is desired and kinds of the desired information in order for an application to acquire content contained in the folder. The IRP_MN_NOTIFY_CHANGE_DIRECTORY allows an application using a file stream to know information that the content contained in the folder has been changed.

The information about the files and directories is stored and managed in their corresponding structures and the relevant structures are connected via the links with each other. The list of files in one folder is configured to have address to a subsequent file. This configuration is described in FIG. 16A. FIG. 16A shows a folder structure to carry out a file hiding in accordance with an embodiment of the present invention. By changing the address of the file that is connected, it is possible to hide virtual drive folders. Therefore, the cache area can be securely protected by hiding a cache drive in this manner.

FIG. 16B shows a case where a folder has been hidden. That is, if it is intended to hide a "folder 2", it is achieved in such a simple manner that a connection structure linked to the "folder 2" is changed to a "folder 3" after breaking it. For example, the folder 2 can be hidden by changing the address to the subsequent folder of NEXTENTRYOFFSET of the folder 1 from the "folder 2" to the "folder 3". Accordingly, it is possible to monitor IRP_MJ_DIRECTORY_CONTROL by utilizing the Minifilter driver function provided from the Microsoft Windows.

Therefore, when an event IRP_MJ_DIRECTORY_CONTROL occurs (S2220), the PC cloud application 2100 checks whether there is the security folder in the client terminal (S2230) and performs the folder hiding when it is checked that the security folder exists (S2240).

Figure 17:
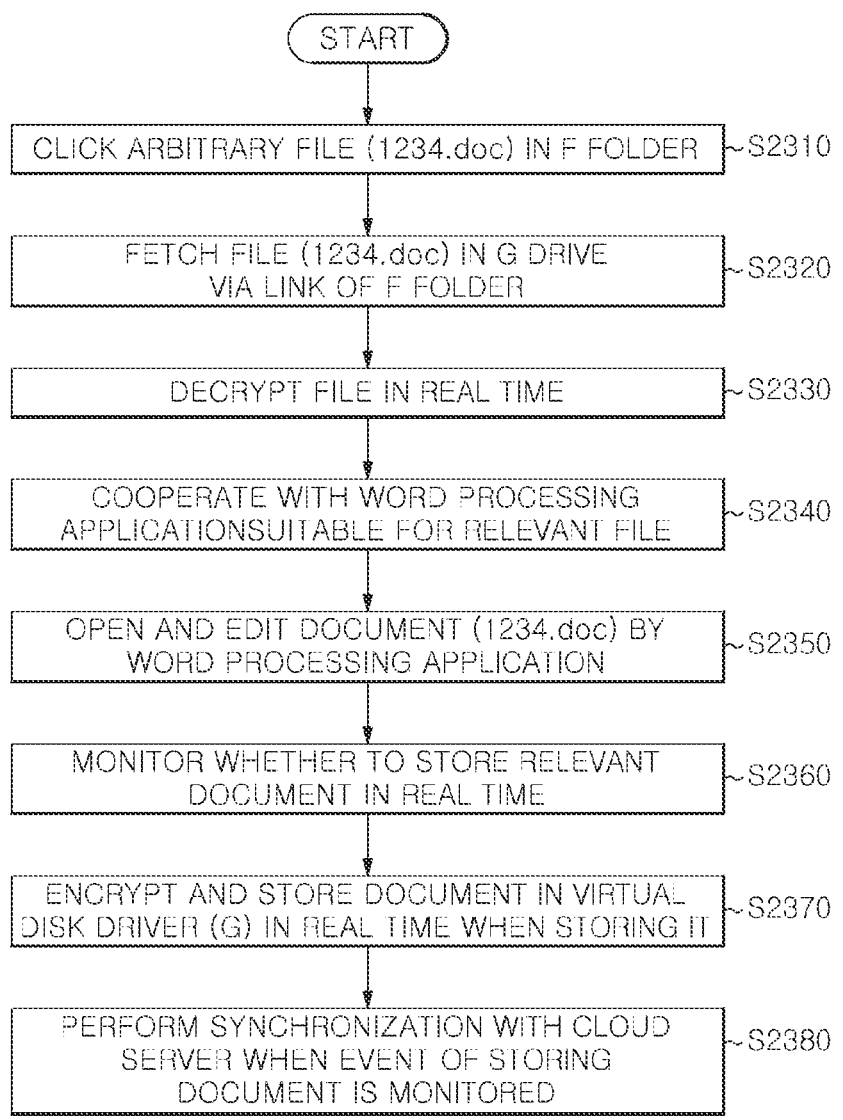
FIG. 17 is a flow diagram illustrating a process of editing a file using the PC cloud application shown in FIG. 10.

FIG. 17 is a flow diagram illustrating a process of editing files using the PC cloud application 2100 shown in FIG. 10.

Referring to FIG. 10, the user clicks any file, e.g., 1234.doc, in the F folder to open the file (S2310). Since the F folder is one having a link to the F folder, the PC cloud application loads into a memory the true file 1234.doc in the G folder via a link ("1234.doc.link") (S2320). In this case, the PC cloud application 2100 decrypts the true file to load it into the memory (S2320).

Figure 18:
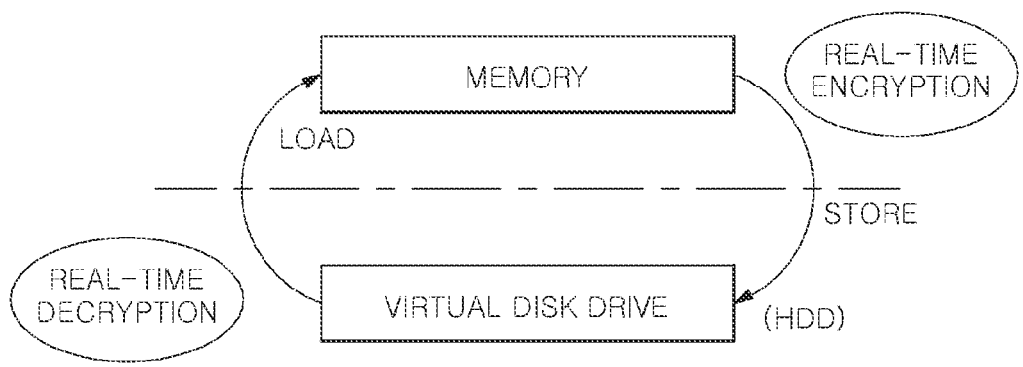
FIG. 18 shows functions in which a PC cloud application loads a file into a memory after fetching it from a virtual disk driver (G folder) and stores a file in virtual disk driver (G folder) after fetching it from a memory.

FIG. 18 shows functions in which a PC cloud application 2100 loads a file into a memory after fetching it from a virtual disk driver (G folder) and stores a file in virtual disk driver (G folder) after fetching it from a memory.

The PC cloud application 2100 decrypts the true file in real time when the file is loaded into the memory from the virtual disk driver (the G folder)(S2330), whereas it encrypts the true file in real time when the file is stored in the virtual disk driver.

In other words, the file name and binary value are separately encrypted and stored in the security file 2 which is the G folder, and the true file (1234.doc) is decrypted in real time when the true file (1234.doc) is loaded into the memory.

Subsequently, the file, 111.doc.doc, is open through the use of a word processing application (e.g., a word processor) suitable for the format of the decrypted file in cooperation with the PC cloud application (S2340). The user then may edit a relevant document of the file using the word processing application (S2350).

Meanwhile, the PC cloud application monitors whether the relevant document stores the file or not in real time (S2360). The cloud application encrypts the file in real time to store it in the virtual disk driver (G) (S2370).

Meanwhile, the synchronization module of the PC cloud application performs the synchronization of the file with the cloud server 10 when an event to store the file is generated during monitoring (S2380).

The real-time monitoring is carried out using a Microsoft I/O filter method. The following are illustrative codes to carry out the real-time monitoring by using the I/O filter method, which are Microsoft API commands.

m_hDirCreateFile=CreateFile(strDirPath,
FILE_LIST_DIRECTORY,
FILE_SHARE_READ/FILE_SHARE_WRITE/FILE_SHARE_DELETE,
NULL,
OPEN_EXISTING,
FILE_FLAG_BACKUP_SEMANTICS,
NULL);

A first parameter that is a path to be monitored in real time is input in strDirPath. Codes to obtain an event in terms of changes in real time are as follows.

ReadDirectoryChangesW(pMain->m_hDirCreateFile,
pMain->m_pbFileBuffer,
FILE_NOTIFY_INFORMATION_SIZE,
TRUE,
dwNotifyFilter,
&dwBytesReturned,
NULL, NULL);

The above example may obtain the changes from handle values that are returned after carrying out the codes. A second parameter that is a path to be changed is inputted and an event that is changed is entered in dwNotifyFilter.

Figure 19:
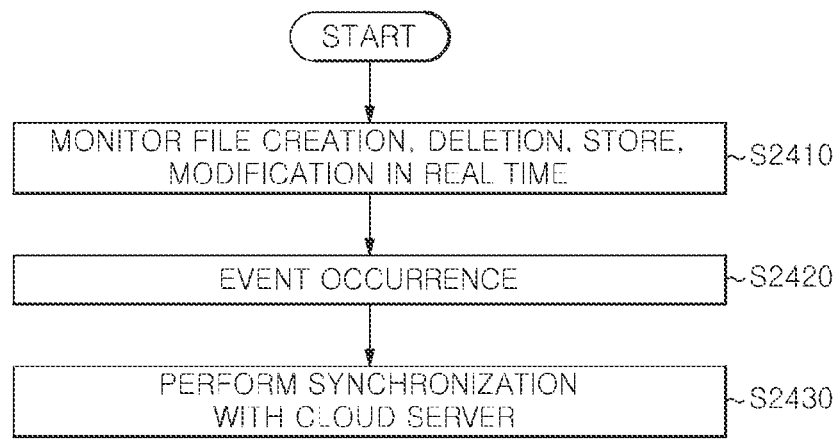
FIG. 19 is a flow diagram for reflecting events such as a creation, name change, deletion, modification, etc. of a file in the folder (G) when the user carries out the event using the PC cloud application 2100 shown in FIG. 10.

FIG. 19 is a flow diagram for reflecting events such as a creation, name change, deletion, modification, etc. of a file in the folder (G) when the user carries out the event using the PC cloud application 2100 shown in FIG. 10.

The synchronization of the PC cloud application 2100 monitors in real time a creation, name change, deletion, modification, etc. of the file in the folder (G) which is the virtual disk driver (S2410). The real time monitoring may employ the Microsoft I/O filter as described above.

When an event occurs (S2420), synchronization with the cloud server is carried out in conformity with the event (S2430).

While the embodiments of the present invention has been described and shown as set forth above, it will be understood by those skilled in the art that various changes and modifications may be made through addition, changes, deletion, or supplement without departing from the scope of the invention as defined in the following claims, and these are intended to be embraced by the scope of the claims of the present invention.

What is claimed is:

1. A client terminal having a memory and a processor coupled to the memory, the processor being configured to run a cloud application connected to a cloud server via a network, the cloud application comprising:
    a first driver controlling module executable by the processor and configured to display a list of folders of a relevant user in the cloud server by communicating with the cloud server;
    a second driver controlling module executable by the processor and configured to encrypt a file of the cloud server to store it as an encrypted security file when the file is stored in the client terminal,
    wherein the security file includes a header portion having an entry of files and folder structures stored therein and a body portion having file binary values stored therein,
    wherein the header and body portions are encrypted, and
    wherein, when a file is selected in the encrypted security file is executed, the second driver controlling module is configured to decrypt the selected file to store it in a system area as a temporary file.

2. The system of claim 1, wherein an area that is displayed on the client terminal is classified into a first driver part and a second driver part so that they can be selected,
    the first driver part being configured to be run by the first driver controlling module and the second driver part being configured to be run by the second driver controlling module.

3. The system of claim 1, wherein the client terminal comprises a smart phone.

4. The system of claim 1, wherein the second driver controlling module further includes a file synchronization unit being configured to perform an update of files stored in the client terminal into a user folder of the cloud server.

5. The system of claim 1, wherein the header portion further includes a file name, a logical structural path, a location of binary, a binary size before encryption, and a hash value after encryption.

6. The system of claim 1, wherein the first driver controlling module is configured to handle communications with the cloud server and the second driver controlling module is configured to handle storage of files from the cloud server in the client terminal.

7. The system of claim 1, wherein the second driver controlling module is further configured to monitor in real time whether an application executing the selected file stores the selected file or is finished with the selected file.

* * * * *